July 4, 1933.  A. R. THOMPSON  1,916,541

MARKER FOR FRUIT BRUSHING MACHINES

Filed March 30, 1931

INVENTOR.
Albert R. Thompson.

BY Philip A. Minnis
ATTORNEY

Patented July 4, 1933

1,916,541

UNITED STATES PATENT OFFICE

ALBERT R. THOMPSON, OF SAN JOSE, CALIFORNIA, ASSIGNOR TO FOOD MACHINERY CORPORATION, OF SAN JOSE, CALIFORNIA, A CORPORATION OF DELAWARE

MARKER FOR FRUIT BRUSHING MACHINES

Application filed March 30, 1931. Serial No. 526,330.

This invention relates to certain new and useful improvements in fruit treating machinery of the general character disclosed in copending applications filed by Lloyd E. Jones, Serial No. 367,667, filed June 1, 1929, and Serial No. 607,577, filed April 26, 1932, such as is commonly used in the fruit packing industry to clean, dry or polish fruit, and has to do with means for indicating the line of demarcation between successive lots of fruit undergoing treatment and for preventing confusion due to the intermingling of different lots of fruit.

In the operation of apparatus of the character referred to the fruit while being subjected to treatment is supported upon and advanced by a series of substantially cylindrical supporting members mounted on fixed axes and arranged in parallel position so as to form article holding grooves therebetween, all the members being adapted for rotation in a common direction. The supporting members may be provided with bristles for brushing the fruit as it is advanced thereover, or with absorbent means for drying the fruit, or they may be just plain rollers.

In the operation of such machines, as is well known, the fruit tends to collect in the grooves between the rotating supporting members where it remains without advancing, so long as no additional fruit is fed to the apparatus. Upon added fruit being fed to the machine, those pieces in the grooves are caused to advance over the tops of the rotating supporting members due to the friction with the supporting members, augmented by the urge of the oncoming fruit behind. In this manner the fruit is advanced through the machine as long as additional fruit continues to be fed thereto. When the fruit ceases to be fed, however, the advance also ceases and the fruit in the grooves remains there since the friction with the supporting members is not in itself sufficient to cause movement of the fruit.

In running successive lots of fruit through such machines it is necessary to keep them separate from each other in order to prevent intermingling of the different lots and thus confusing different kinds of fruit or mixing fruit belonging to one grower with that belonging to another, and to do this it is necessary that each lot be run separately. As pointed out above, however, after the feeding of one lot is completed the advance of the fruit stops, so that a certain amount remains in the machine and must be cleaned out before the next lot is fed, in order to prevent mixing.

In cases where large numbers of small lots are being treated, the time lost by delay, due to the cleaning out operations necessary after each lot, reaches a considerable amount and it is the object of my invention to prevent this loss by eliminating the necessity for cleaning out the machine by providing a simple device adapted to prevent intermixing of the fruit, so that it can be fed continuously without danger of intermingling.

Another object is to provide in a machine of the type described means for indicating a line of demarcation between successive lots of fruit, so that there will be no danger of intermingling and the fruit can be continuously fed.

For the purpose of this disclosure, I have shown my invention as applied to a brushing machine, and it will be seen that the invention includes the combination with such a machine of a light weight cylindrical element having a diameter approximately the same as the fruit which the brushing machine is designed to operate on, so that it is adapted to rest in the grooves between the supporting elements with its lengthwise dimension crosswise of the apparatus. I have found that such an element will remain in the groove during rotation of the brushes in the same manner that the fruit does, unless urged forward by some additional pressure. This pressure may be supplied by oncoming fruit behind it, as long as the fruit is fed to the machine, and will thus be advanced through the machine by the fruit itself. Any fruit in front of the cylinder will be advanced thereby as it advances, and it has been found that the fruit will not jump over it, so that in this matter intermingling is prevented and a clear line of demarcation maintained.

A better understanding of the invention may be had by reference to the accompanying drawing, in which like reference characters refer to like parts throughout the several views.

Figure 1:
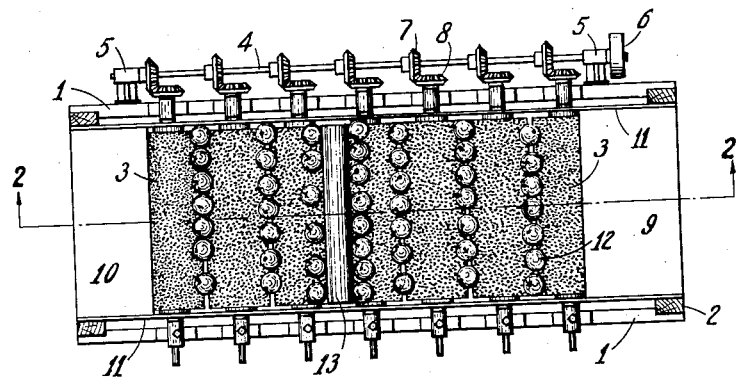
Figure 1 is a plan view of a fruit brushing apparatus having my invention applied thereto.
Figure 2:
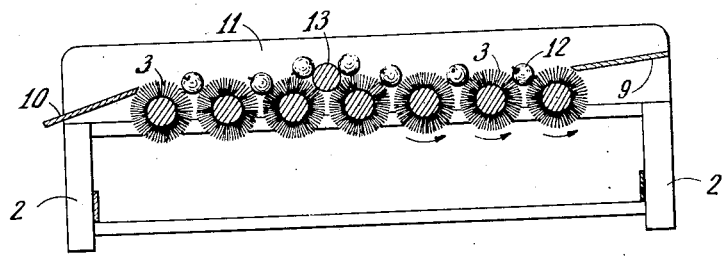
Figure 2 is a sectional view along the line 2—2 of Figure 1.

Referring to the drawing, the apparatus illustrated comprises a suitable supporting frame 1 provided with legs 2 and carrying a plurality of transversely disposed rotatable brushes 3, all of which are adapted to rotate in the same direction, so that the fruit may be advanced across the brushes transversely to their axes.

The driving means for the brushes comprises a drive shaft 4 located to one side of the apparatus and mounted to rotate in bearings 5 secured to the frame 1. Power may be supplied to a suitable pulley 6 keyed to one end of the drive shaft. A plurality of bevel gears 7 are also keyed to the drive shaft and adapted to mesh with corresponding gears 8 fixed to the outer ends of the axles upon which the brushes are carried. By this construction, when power is applied to the pulley 6, so that the brushes are caused to operate in the direction of the arrows, fruit to be treated may be fed onto the brushes over a suitable ramp 9 and as long as additional fruit continues to be fed it will be advanced transversely across the brushes and finally discharged therefrom over the discharge ramp 10. A pair of guide walls 11 are mounted adjacent the outer ends of the brushes and serve to keep the fruit on the brushes.

In the operation of the machine thus far described, when the pieces of fruit 12 are fed onto the brushes over the ramp 9, they collect in the groove between the first two brushes until the groove is full, whereupon, when any additional pieces are fed their weight against the fruit in the groove operates to advance those pieces with which they contact, which are thereupon advanced over the top of the brush into the next groove, the newly fed pieces taking their places. It has been found that this action takes place only when the groove is full, due to the fact that the pieces in the groove tend to move sideways when contacted from behind, to make room for oncoming pieces. As soon, however, as the groove is full the fruit can no longer move sideways and thereupon advances forwardly over the brushes upon additional pieces being fed. In this manner, as long as the fruit is fed it is continually advanced over the brushes. When the supply is stopped, however, the advance stops, so that the fruit in the grooves remains there regardless of the rotation of the brushes.

As may readily be seen if in this situation a different lot of fruit is fed to the machine without first cleaning out the pieces remaining therein, the two lots will intermingle with each other to a greater or less extent, depending upon the manner in which the second lot is fed. In order to prevent this, I provide a cylindrical element 13, which may be made of any light weight material, so that it may be urged forward by the fruit behind it. Preferably this marking element is about the diameter of the fruit being treated, since a larger size is unnecessary and only adds to the weight. On the other hand, if it be too small the fruit may jump over it, in which case its object would be defeated. The marking element extends substantially the entire width of the brushes so that the fruit is prevented from passing around its ends and the guide walls 11 keep it in place in the same manner as the fruit.

In operation, when one lot of fruit has been entirely fed to the machine and it is desired to feed the next lot immediately, it will not be necessary to clean out the machine as has been the practice heretofore, but the marking element is placed on the first brush, whereupon it will displace the row of fruit in the first groove and this amount will not in turn be discharged from the machine. The pieces of the new lot, which may now be fed, will act upon the roller in the same way as they would upon the fruit and it will advance to the next groove, again displacing the fruit therein. In this way the roller is advanced through the machine by action of the fruit behind it and it advances the fruit ahead of it. Since the fruit will not jump over the roller, intermingling is prevented and a clear line of demarcation between separate lots is maintained.

Although I have described my invention as applied to a fruit brushing machine, it will be apparent that its use is not confined thereto, but that it is also applicable to other types of machines having other types of supporting means. For example the apparatus may be used in connection with mechanism for washing or drying the fruit as it passes over the supporting elements, and the supporting elements may be covered with other materials than bristles, or they may be just plain. It will also be seen that various changes and modifications may be made in the details of the apparatus shown without departing from the spirit of my invention and I deem myself entitled to all such modifications and variations as fall within the scope of the claims appended hereto.

Having now described my invention and in what manner the same may be used, what I claim as new and desire to protect by Letters Patent is:

1. In an apparatus of the class described, the combination with a plurality of rotatable supporting members disposed in parallel relationship to form an article supporting runway of a marking element freely supported by said members transversely of the runway for advancement thereover.

2. In an apparatus of the class described, the combination with a plurality of rotatable supporting members disposed in parallel relationship to form article holding grooves therebetween of a marking element, freely supported in one of said grooves and extending substantially the length thereof for advancement from one groove to another.

3. In an apparatus of the class described, the combination with a plurality of cylindrical supporting members rotatably mounted in parallel relationship to form article holding grooves therebetween of a substantially cylindrical marking element, substantially the length of the grooves and freely supported by said members for advancement thereover from one groove to another.

4. In an apparatus of the class described, the combination with a plurality of cylindrical supporting members disposed in parallel relationship to form an article supporting runway of means for rotating all of said members in the same direction, and a marking element resting between a pair of said members transversely of the runway for advancement from one pair of supporting members to another and being solely supported thereby.

5. An apparatus of the class described, comprising a frame, a plurality of transversely disposed rotatable supporting members mounted thereon to form article holding grooves therebetween, a marking element resting in one of said grooves and extending substantially throughout its length, said marking element being free to advance from one groove to another.

6. An apparatus of the class described, comprising a frame, a plurality of transversely disposed substantially cylindrical supporting members mounted thereon to form article holding grooves therebetween, means for rotating all of said supporting members in the same direction, and a marking roller resting in one of said grooves and being free to advance from one groove to another.

7. An apparatus of the class described, comprising a frame, a plurality of transversely disposed substantially cylindrical supporting members mounted thereon in side by side parallel relation to form an article supporting runway, means for rotating all of said supporting members in the same direction to advance articles transversely thereacross, and a marking element extending transversely of the runway and supported by the members for movement thereover by the urge of articles being advanced over said members.

Signed at San Jose, California, this 21st day of February, 1931.

ALBERT R. THOMPSON.